ns Patent [19] [11] 4,230,048
Gordon et al. [45] Oct. 28, 1980

[54] RAILROAD CAR

[75] Inventors: Robert Gordon, Arcadia; Oscar Weingart, Riverside; Harry A. King, Yorba Linda, all of Calif.; James V. Springrose, Edina, Minn.

[73] Assignees: Structural Composite Industries, Inc., Azusa, Calif.; Cargill Incorporated, Minneapolis, Minn.

[21] Appl. No.: 851,154

[22] Filed: Nov. 14, 1977

[51] Int. Cl.² .............................................. B61D 7/02
[52] U.S. Cl. .................................. 105/248; 105/414; 105/358
[58] Field of Search ................................ 105/246–249, 105/358, 360, 377, 265–267, 414, 270, 271

[56] References Cited

U.S. PATENT DOCUMENTS

| 1,839,701 | 1/1932 | Pollock et al. | 105/414 |
|---|---|---|---|
| 3,070,039 | 12/1962 | Mohr | 105/270 |
| 3,158,383 | 11/1964 | Anderson et al. | 105/360 |
| 3,217,661 | 11/1965 | Kemp | 105/377 |
| 3,572,252 | 3/1971 | Coover et al. | 105/248 |
| 3,599,575 | 8/1971 | Yurkoski | 105/358 |
| 3,605,634 | 9/1971 | Johnson | 105/248 |
| 3,662,692 | 5/1972 | Price et al. | 105/358 |
| 3,720,173 | 3/1973 | Van Wierst | 105/271 |
| 3,876,739 | 4/1975 | Loveland | 105/358 |
| 3,921,537 | 11/1975 | Fleshman et al. | 105/248 |

Primary Examiner—L. J. Paperner
Assistant Examiner—Lawrence E. Williams
Attorney, Agent, or Firm—Fitch, Even, Tabin, Flannery & Welsh

[57] ABSTRACT

A railroad car has an elongated cylindrical car body formed of thin cylindrical longitudinal walls and closed at each end by a respective end wall, a coupler at each end of the car body for coupling the car to other cars, a truck at each end of the car body, and a supporting structure mounted on each of the trucks for supporting the car body on the respective truck for transport on rails. As described, the end walls are conical and truncated, the longitudinal and end walls comprising continuously wound filaments impregnated with resin with the filaments lying in the longitudinal walls at an angle of less than 30° to the longitudinal direction and extending in the end walls to the region of the truncation. Each of the supporting structures connects a coupler to beam columns at a respective end of the cylindrical walls for transmitting forces substantially horizontally from the coupler to the car body, and is connected to the respective end wall for transmitting forces substantially vertically from a truck to the end wall to support the car body, the car body being substantially self-supporting between supporting structures.

20 Claims, 13 Drawing Figures

RAILROAD CAR

This invention relates to railroad cars and more particularly to hopper-type cars wherein a cylindrical, self-supporting car body formed of continuously wound filaments is vertically supported at its ends on trucks, with longitudinal forces on the car couplers transmitted horizontally to the ends of the cylindrical longitudinal walls of the car body.

Conventional railroad cars generally include an underframe with sills extending the length of the car for supporting a car body and transmitting longitudinal forces, with the underframe supported near its ends on trucks. Tank cars have been made wherein a tank is cradled near its ends in cradle structures mounted on the trucks, as shown in Geyer, et al. U.S. Pat. No. 3,712,250. As there shown, a center sill transmits longitudinal forces. Tanks have been made of fiber glass reinforced plastics, as shown in Anderson, et al. U.S. Pat. No. 3,158,383, and such tanks have been mounted on railroad car underframes of the sort shown in the aforesaid U.S. Pat. No. 3,712,250. It is also known, as shown in Phillips U.S. Pat. No. 3,252,431, to support a car body near its ends by cradling it on short truck-supported sill sections, with the car body reinforced as to be self-supporting between the sill sections. Steel hopper cars with stub center sills have been made where the car body has been supported on trucks by bolster structures extending upward from the trucks to the underside of respective sloping end plates, with massive stiffening members for resisting the bending of such end plates by the substantial transverse forces supporting the car body.

Such cars of the prior art have included heavy supporting structures and/or heavy structural elements in the car body itself that have required a substantial portion of the gross weight of a loaded car to be the weight of the car itself. As the gross weight of a railroad car is limited by regulations, any reduction in the weight of the car itself permits a larger payload and hence more economical operation. In the United States, to be eligible for interchange betweeen railroads, the cars must meet the specifications for acceptability of the Association of American Railroads, including such weight limitations.

In accordance with the present invention, the car is made lighter than conventional cars by providing a thin-walled car body of light construction and light supporting structures. The car body is formed of thin cylindrical walls and is closed at each end by a respective end wall. Supporting structures support the car body on trucks by the end walls. The supporting forces act substantially vertically on the end walls without applying substantial forces transverse of the end walls. At the same time, horizontal forces are transmitted from the car couplers to the ends of the cylindrical walls. The supporting structures do not extend under the longitudinal walls, yet they provide light-weight, stable supports.

The car body is preferably made of continuously wound filaments as of glass in a resin matrix. The filaments are wound to provide the cylindrical longitudinal walls, with the filaments wound at an angle of less than 30° from the longitudinal axis of the car body to achieve greater strength in the longitudinal direction. An angle of about 20° has been found particularly advantageous, providing a convenient angle for winding the car body while maintaining a longitudinal strength approximately 80% of maximum strength with all filaments longitudinal. The filaments continue beyond the ends of the longitudinal walls along the surfaces of respective truncated cones to form substantially conical end walls, wherein the filaments are concentrated near the truncations of the cones, providing reinforced regions for supporting the car body at its ends. The resin matrix in which the filaments are embedded serves to transfer loads between filaments to hold the shape of the structure and protect the filaments. Such resin/filament composite construction is relatively light for the structural strength afforded, and is particularly strong in tension in the direction of the filaments. Beam columns are formed on the longitudinal walls for transmitting forces longitudinally of the car.

It is thus a primary object of the present invention to provide a lightweight railroad car. It is another object of the invention to provide such a car having a car body with cylindrical longitudinal walls formed of reinforced, continuously wound filaments, with end walls supported vertically from trucks, and with horizontal forces applied from end couplers to the ends of the longitudinal walls. It is a further object of the invention to provide such a car made of material that is inherently corrosion resistant.

Other objects and advantages will be apparent from a consideration of the following detailed description, particularly when taken in conjunction with the accompanying drawings in which:

FIG. 4 is a vertical section of a portion of the car body of the railroad car shown in FIG. 1 taken along the center line of the car, with a portion shown in elevation;

Figure 1:
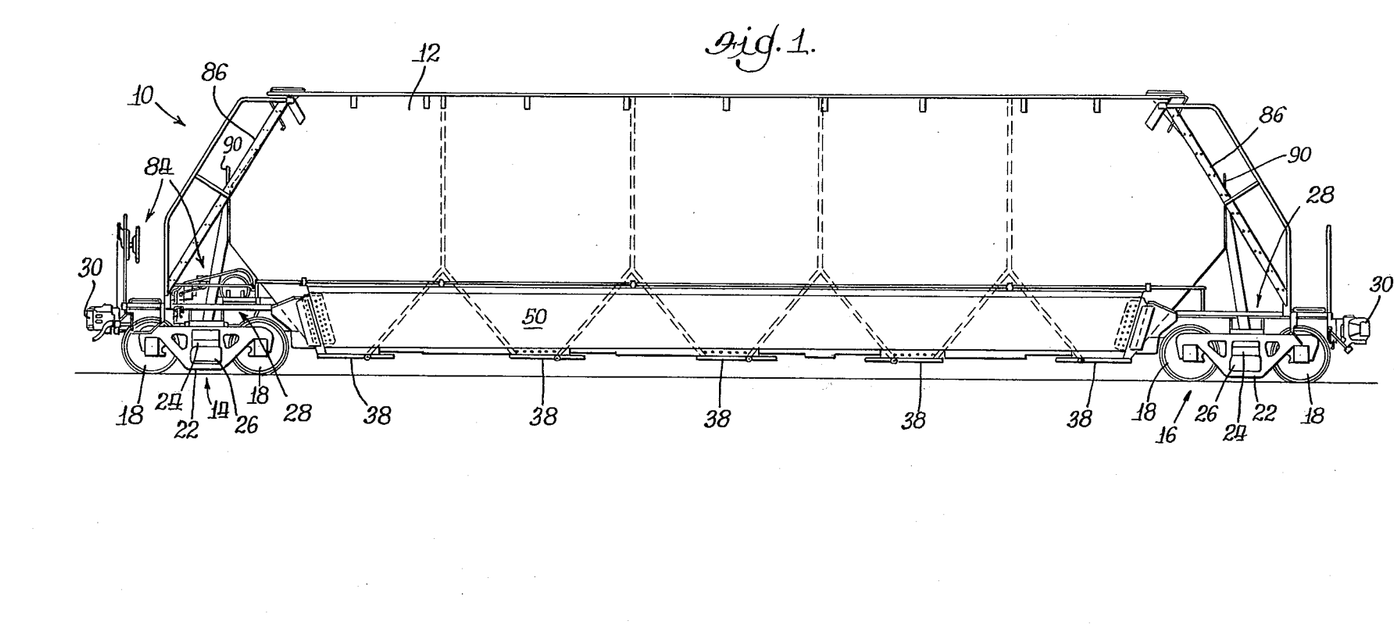
FIG. 1 is a side elevation of one form of railroad car of the present invention.
Figure 2:
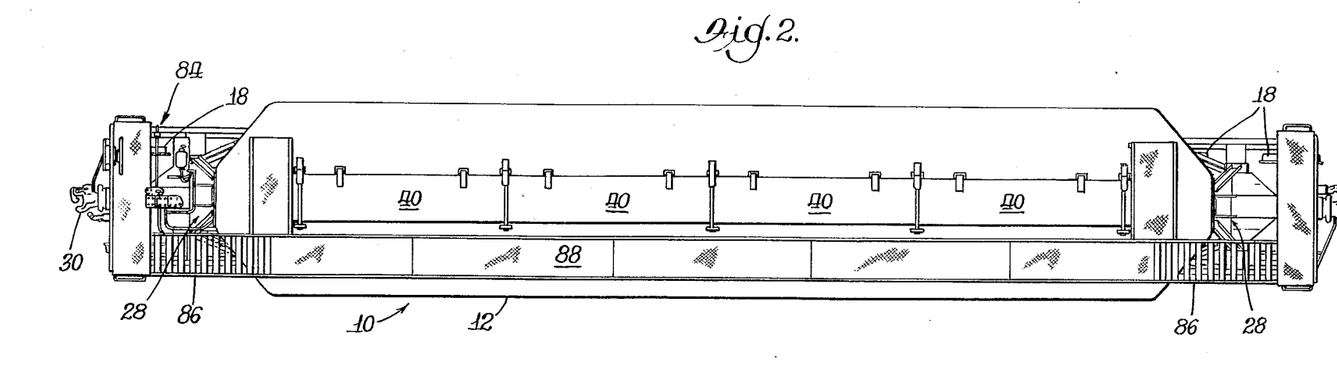
FIG. 2 is a plan view of the railroad car shown in FIG. 1.
Figure 3:
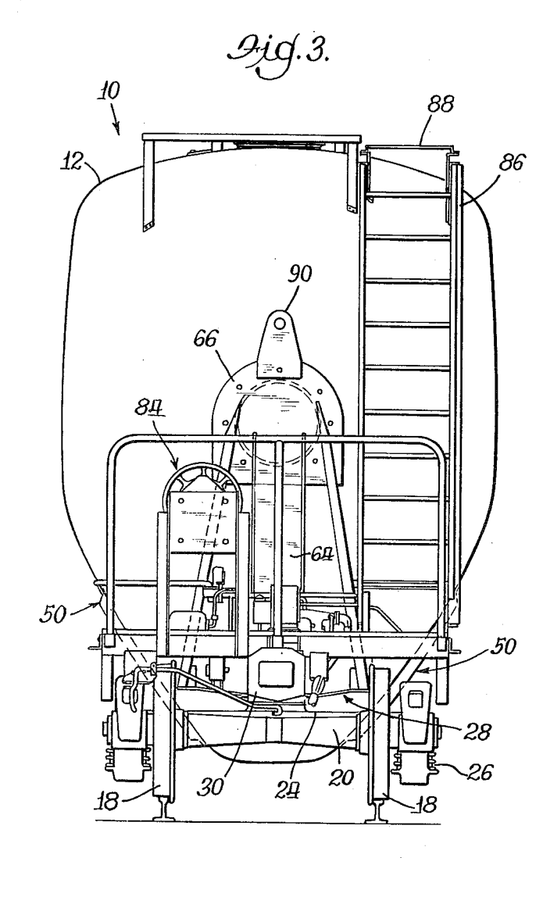
FIG. 3 is an end view of the railroad car shown in FIG. 1.
Figure 5:
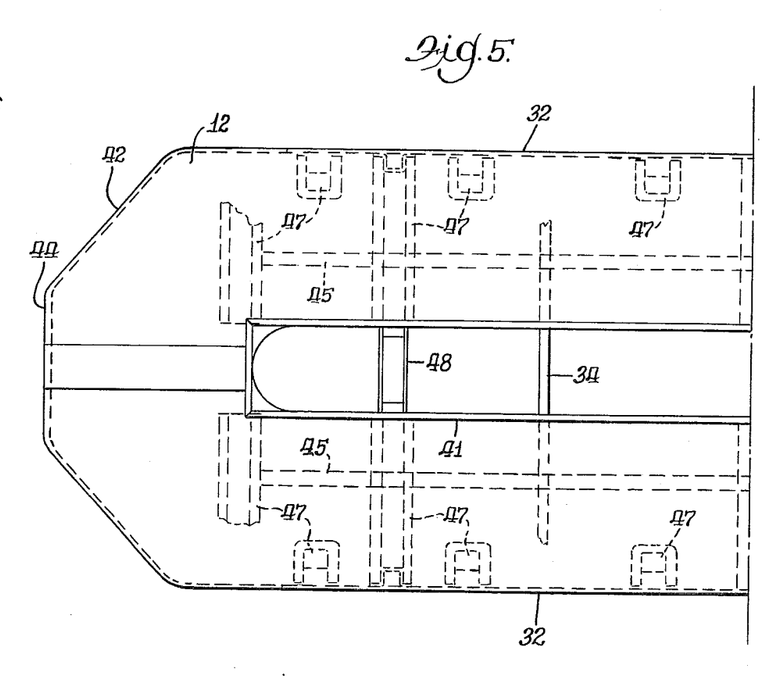
FIG. 5 is a plan view of a corresponding portion of the car body of the railroad car shown in FIG. 1.

As shown in FIGS. 1, 2 and 3, a railroad car 10 comprises a car body 12 supported at its ends by trucks 14 and 16. The trucks 14 and 16 may be conventional railroad car trucks for mounting railroad car bodies for rolling on rails. The trucks 14 and 16 may, as shown, include wheels 18, joined by axles 20, on which are supported truck side frames 22. Truck bolsters 24 are resiliently supported on the truck side frames 22 by springs 26. A supporting structure 28 is rotatably mounted on each truck bolster. Such supporting structure is connected to a respective coupler 30 at each end of the car for coupling to other cars, including a locomotive.

Figures 6, 7, 8:
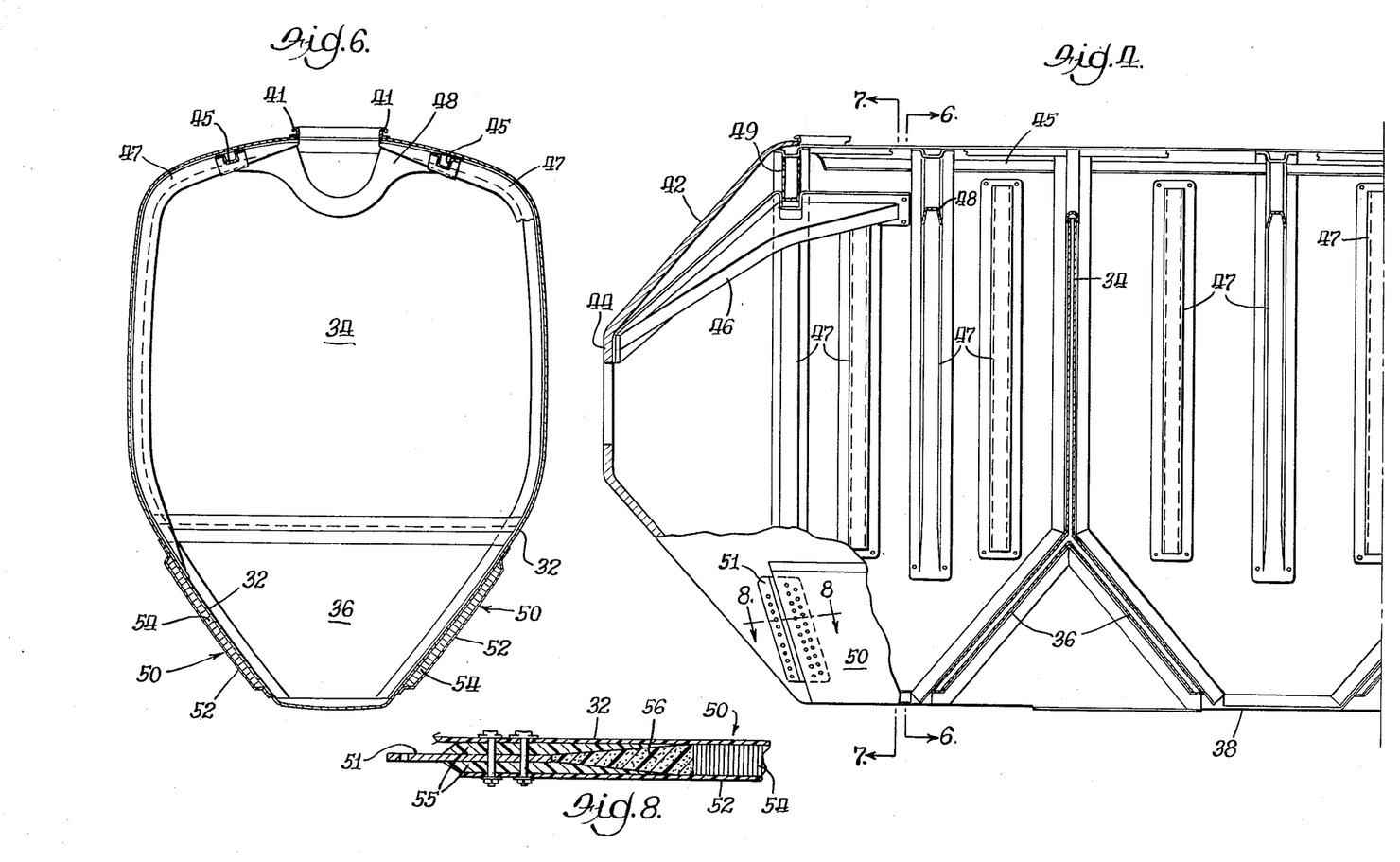
FIG. 6 is a vertical sectional view of the car body shown in FIG. 4, taken along line 6—6 of FIG. 4.
FIG. 7 is a vertical sectional view of the car body shown in FIG. 4, taken along line 7—7 of FIG. 4.
FIG. 8 is a sectional view of the end of a beam column used in the car body shown in FIG. 4, taken along line 8—8 of FIG. 4.
Figure 7:
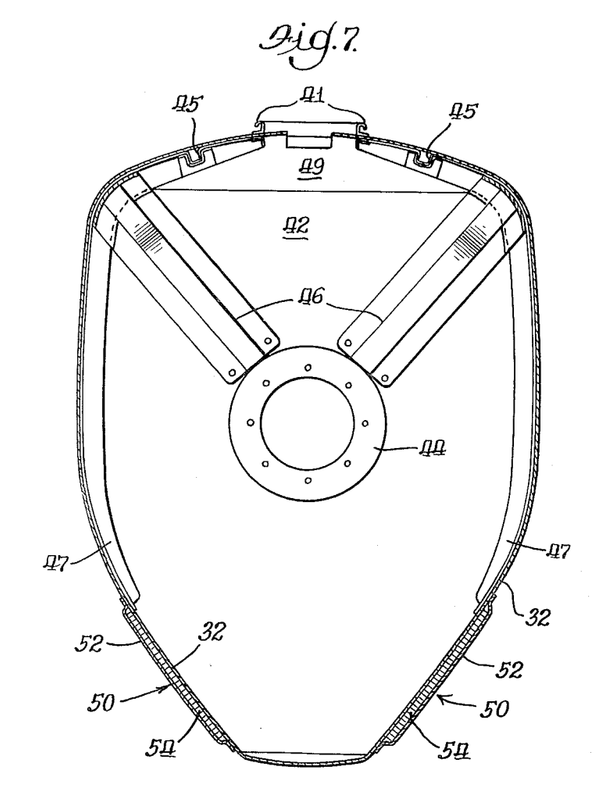
Figure 9:
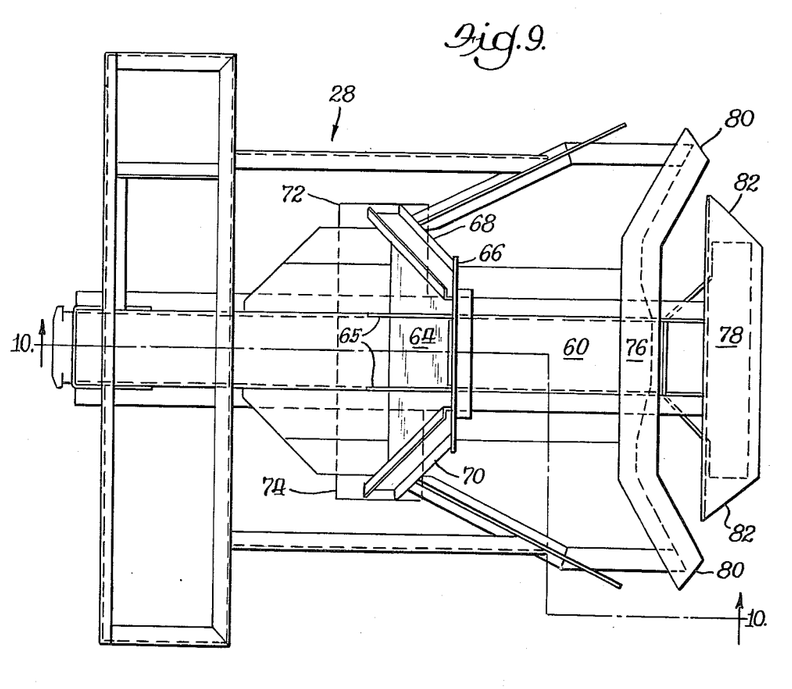
FIG. 9 is a plan view, partly in section, showing in greater detail the supporting structure of the railroad car shown in FIG. 1.
Figures 10, 12, 13:
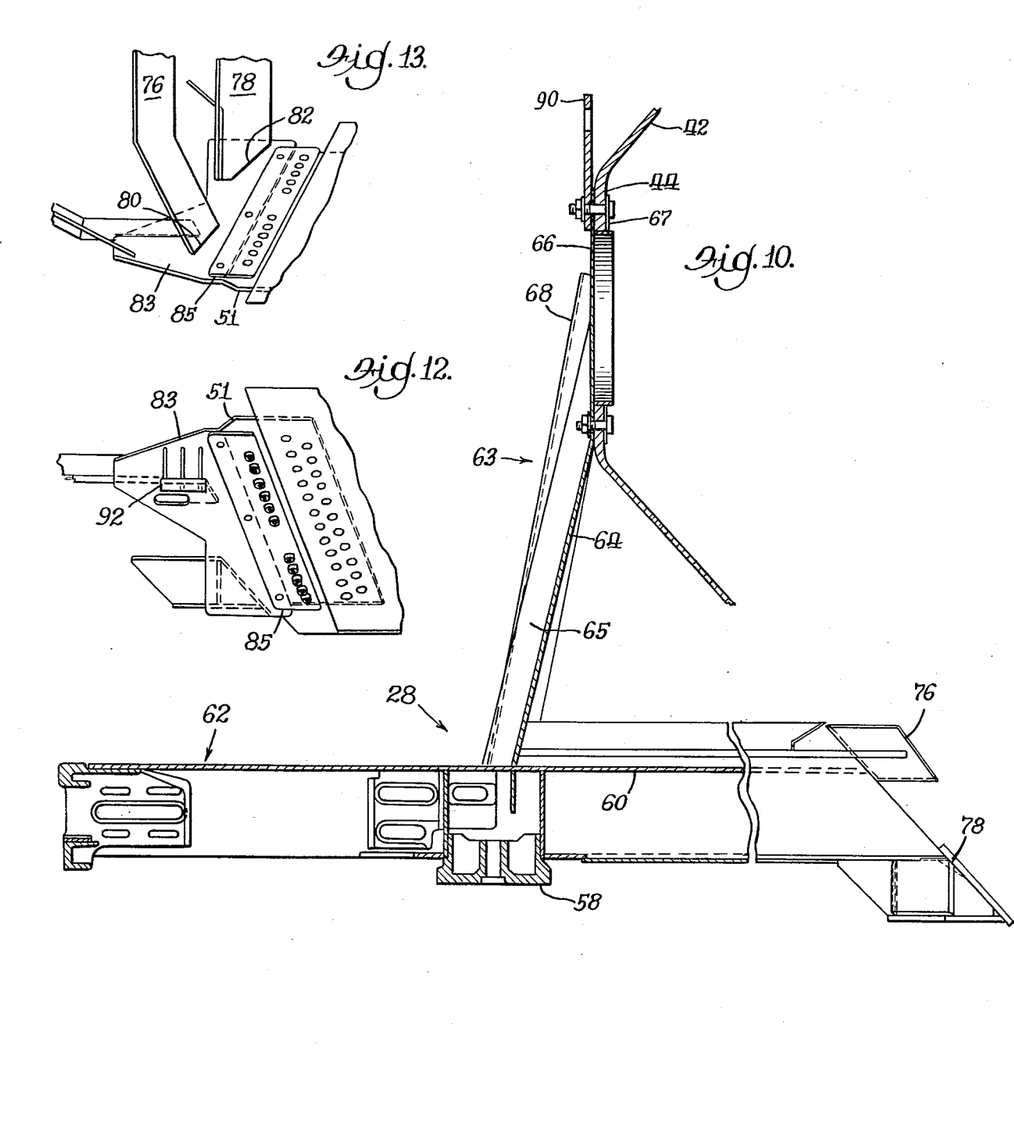
FIG. 10 is a vertical sectional view of the supporting structure shown in FIG. 9, taken along line 10—10 of FIG. 9; and also showing the connection thereof to the end wall of the car body.
FIG. 12 is a side elevation of part of one side of the supporting structure shown in FIG. 9, showing the connection to the end of the beam column shown in FIG. 8.
FIG. 13 is a plan view of the structure shown in FIG. 12.
Figure 11:
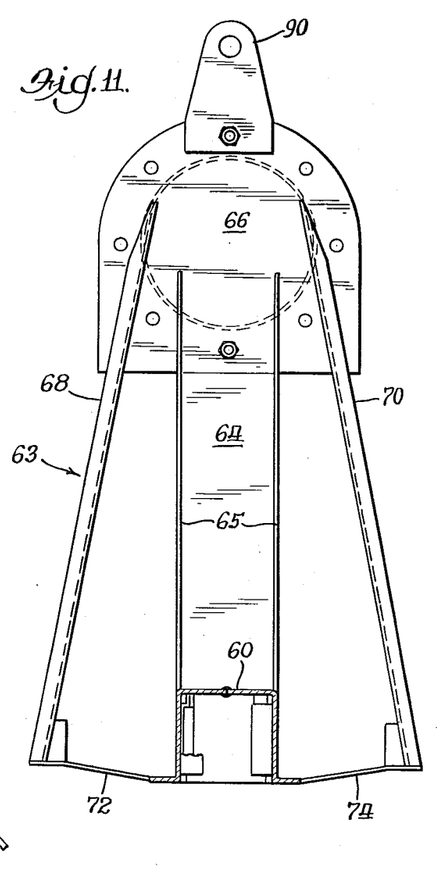
FIG. 11 is a vertical end view of the vertical supports of the supporting structure shown in FIG. 8, with the center sill of the supporting structure shown in section.

As shown in greater detail in FIGS. 4, 5, 6, and 7, the car body 12 is generally cylindrical in the broad sense that it has a generally uniform cross section, as shown in FIGS. 6 and 7, with walls 32 extending longitudinally of the car. To obtain a relatively large cross section within standard railroad car limits as provided by regulation, the side walls 32 are relatively vertical and the top is relatively horizontal. At the same time, there are no sharp angles, the entire car being formed by winding filaments on a mandrel having curved surfaces. In order to facilitate the removal of the contents of the car, the car body is formed as a hopper-type car, particularly for carrying grain, with sloping sides near the bottom at a slope angle of about 50° to the horizontal. The car body is divided into separate hopper sections by bulkheads 34 which extend down to slope sheets 36 which form the lower portions of the hopper sections and are also sloped at an angle of about 50° to the horizontal to facilitate removal of the contents of the hopper sections. Hopper gates 38 provide means for opening the hopper sections for removal of the contents in a conventional manner. The tops of the various hopper sections are covered by hatch covers 40 mounted on hatch rails 41. The hatch covers 40 may be opened to permit filling of the respective hopper sections. At each end of the car is a substantially conical end wall 42 formed integrally with the longitudinal walls 32 and extending from the ends of the longitudinal walls to truncations 44 of the end walls 42, where the supporting structures 28 are connected to the car body 12. The slopes of these walls at the bottom are about 50° to the horizontal. The walls are substantially conical in the broad sense that their surfaces are substantially traced by a straight line passing through a respective vertex, whereby vertical forces at the truncations produce forces transmitted along substantially straight lines to the ends of the longitudinal walls. A circular cone with its vertex near the centroid of the longitudinal walls has been found particularly advantageous as it provides a shape convenient for filament winding.

The car body illustrated is made by winding continuous filaments on a mandrel at an angle of about 20° to the longitudinal direction of the car body, with the filaments extending along and around the conical ends to the truncations. A number of filaments are laid down in a wide band, perhaps 8 inches in width, with the filaments laid in one longitudinal direction crossing those laid in the opposite direction, both being at about 20° from longitudinal and hence at 40° from each other. The winding is programmed to cover the mandrel completely. Several layers are laid in each direction to build up a thickness of about 0.3 inches. Because of the smaller diameters at the truncations 44, the filament layers overlap more there, providing thicker and hence stronger sections for connection to the supporting structures 28. In fabrication, the filaments are coated with resin as they are laid on the mandrel. The resin is cured on the mandrel.

The car body is then cut in half vertically along the longitudinal center line for removal from the mandrel and insertion of additional structural components such as the bulkheads 34 and slope sheets 36. The two halves of the car body are then fastened together and to the respective bulkheads 34, slope sheets 36, gates 38 and hatch covers 40. The bulkheads and slope sheets and the mountings for the gates and hatch covers provide stabilization and/or reinforcement for the car body. The bulkheads and slope sheets may each be formed of a pair of sheets formed of woven continuous glass filaments in a resin matrix, with the sheets spaced by a lightweight core material, such as conventional honeycomb kraft paper core material, for providing bending strength. Two-inch thick spacers in the bulkheads and two-inch thick spacers in the slope sheets have proven satisfactory. Additional reinforcement is provided by horizontal beams 45 extending substantially the length of the roof of the car for supporting the roof, and by ribs 46 extending upwardly and outwardly from the truncation 44 to and past the respective ends of the longitudinal walls 32 for supporting the car body at the small radii of curvature where the roof meets the sides of the body. These aid in supporting the car body and reinforce the roof and end walls 42, respectively, against buckling upon loading of the car. Ribs 47 affixed to the inside of the walls 32 of the car body 12 may be used to stabilize the car body in the respective hopper sections. The ribs 47 extend in the circumferential direction to shorten the unsupported longitudinal spans of the car body and hence increase the buckling strength of the top portion of the car body acting as a column in compression. The ribs 46 and 47 may be secured to respective car halves before the halves are fastened back together. Arcuate crosspieces 48 span the hatch openings to connect certain of the ribs 47 on opposite sides of the car. At the ends of the car, straight struts 49 join the end ribs 47. As the ribs 46 extend over the end ribs 47, the struts 49 and end ribs 47 act to reinforce the roof of the car body at its ends against buckling, as may otherwise be occasioned by the lifting forces along the ribs 46. The beams 45, the ribs 46 and 47, the crosspieces 48 and the struts 49 are all preferably made of woven continuous glass filaments in a resin matrix. Their shapes may be characterized as hat shaped, so as to form box beams when the bases of the hats are secured to the walls 32 or 42.

The car body 12 is designed to be self-supporting between the supporting structures 28. It is also designed to transmit horizontal forces to and from the couplers 30. These forces include the sideways forces to turn the car at curves as well as the longitudinal forces for pushing and pulling the car. The most significant forces are generated upon impact, as upon humping the car. Such forces are transmitted longitudinally along the longitudinal walls 32 and are applied endwise to the walls through the actions of the supporting structures 28.

The center line of a standard coupler is $34\frac{1}{4}$ inches above the rails. This provides an unbalanced load at the ends of the longitudinal walls 32, placing a compressive load near the bottom of the walls upon humping. Because the walls are very thin, for example, about 0.3 inches, beam columns 50 are provided along the bottom of each side of the car. These beam columns 50 terminate in plates 51 and are formed by respective longitudinal members 52 extending the length of the longitudinal walls 32 and spaced therefrom by spacers 54 of a lightweight core material which may be conventional honeycomb kraft paper cores. The longitudinal members 52, which may be about 3/16 inch thick, may also be formed of continuous glass filaments in a resin matrix. The filaments are preferably woven into fabric with the warp filaments extending in the longitudinal direction of the members. The longitudinal walls 32 and the longitudinal members 52 are adhesively fastened to the spacers 54. The members 52 extend laterally beyond the spacers 54 where they are adhesively fastened directly to the walls 32.

As shown particularly in FIG. 8, a plate 51 is fastened to each end of each beam column 50. The plate 51 is curved slightly to conform to the shape of the cross section of the beam column 50 and extends in the longitudinal direction in order that forces may be transmitted longitudinally into and out of the beam column 50. The plate 51 is preferably disposed midway between the longitudinal wall 32 and the longitudinal member 52. The plate 51 is spaced from each but adhesively coupled to each by adhesive members 55, which may be made of an epoxy resin. For providing an appropriate distribution of forces, a spacer 56 of soft material, such as formed polyurethane is disposed between the proximal end of the plate 51 and the spacer 54 and is shaped to provide a tapering of the adhesive members 55 in the direction of the spacer 54. The plate 51 is also secured to the longitudinal wall 32 and the longitudinal member 52 by bolts to assure a firm and lasting connection by which a supporting structure may be connected to the beam column 50 for the transmission of longitudinal forces.

The spacers 54 in the beam columns 50 may be about three inches thick, thus providing a relatively stable column for end loading, permitting the transmission of the forces required. THe bulkheads 34 and slope sheets 36 extend across the car and stabilize the beam columns 50 by dividing them into short sections, leaving only relatively short unsupported buckling lengths, and hence providing increased strength against buckling. As these beam columns transmit most of the longitudinal load, the bending effect of the eccentric loading of the ends of the longitudinal walls 32 is reduced. At the same time, they save weight over having the walls 32 reinforced all the way around.

The supporting structures 28 may be identical and may be as shown in FIGS. 9, 10, 11, 12 and 13. Each supporting structure 28 includes a stub center sill 60 mounted on a center bearing plate 58 pivotally mounted on conventional center pin and center plate liner of a respective truck 14. Conventional draft rigging 62 may connect the coupler 30 to the center sill 60 and the center plate 58. A bolster structure 63 for supporting the car body is rigidly supported on the center sill 60. A central strut 64 of the bolster 63 extends substantially vertically from the center sill 60 at the bearing plate 58 to the truncation 44 of the end wall 42. The strut 64 is preferably in the form of a plate stiffened by ribs 65 and terminating in a vertical connecting plate 66. A clamping ring 67 is connected to the connecting plate 66, as by bolts, to clamp the connecting plate 66 to the end wall 42 at the truncation 44. Side struts 68 and 70 extend upwardly along the edges of the central strut 64 and are secured at their upper ends to the plate 66. Side plates 72 and 74 extend outwardly along the bottom of the central strut 64 from the center sill 60 at the center bearing plate 58 to the edges of the central strut 64 at the lower ends of the side struts 68 and 70. The ends of the side plates 72 and 74 are disposed above conventional truck side bearings so that the side struts 68 and 70 provide support for the car body 12 when tilted out of vertical. The bolster 63 thus supplies a substantially vertical support for the car body 12 while applying but a relatively small force longitudinally to the car body. The car body is thus relatively freely suspended at its two ends and is self-supporting therebetween. Because the lifting forces are applied at the distal ends of the end walls 42, rather than transversely of the end walls or the longitudinal walls 32, heavy reinforcement of the thin walls 32 and 42 is not needed.

An upper cross beam 76 and a lower cross beam 78 are rigidly affixed to the top and bottom, respectively, of the center sill 60, as by trusses and/or shear plates, as illustrated. Each of the cross beams 76 and 78 is symmetrical about the centerline of the car. At each end 80 of the upper cross beam 76 and at each end 82 of the lower cross beam 78, the cross beams are rigidly affixed, as by welding, to respective corner plates 83. As shown more particularly in FIGS. 12 and 13, the ends 80 and 82 are custom fit to the corner plates 83. The corner plates 83 are curved slightly to conform to the plates 51 at the ends of the beam columns 50. The plates 83 and 51 butt and are removably fastened together. As shown, the plates 83 terminate in splice plates 85 welded to each side of each plate 83 and extending over each side of the respective plates 51 to which they are bolted. The forces applied longitudinally to the plates 83 are thus transmitted longitudinally to the plates 51. The cross beams 76, 78 thus provide a yoke having four connections to the ends of the longitudinal walls 32 at balanced locations. The locations are balanced in the sense that force applied longitudinally at a coupler 30 is distributed among the four locations above and below and side-to-side in such a manner that relatively little torque is applied to the car body. Rather, the force is transmitted substantially entirely longitudinally to the beam columns 50 and hence produces relatively small stresses in the rest of the car body 12. More particularly, such locations are preferably symmetrical with respect to the centerline of the car and are equidistant above and below the centerline of the couplers 30 so as to apply one-fourth of the longitudinal force at each location.

The railroad car 10 includes various other pieces of equipment as may be desirable or necessary. Such equipment, which may or may not be conventional, includes braking apparatus 84, a ladder 86 and a running board 88. A lifting eye 90 may be provided on each plate 66 for raising an overturned car with a crane. The corner plates 85 may be fitted with pads 92 for jacking up the car in the event of derailment or to change trucks.

Various modifications may be made in the railroad car within the scope of the present invention. For example, the car may be designed as a tank car rather than a hopper car. Particularly in tank cars where relatively high pressures may be encountered, circumferential or hoop windings may be added to provide more bursting strength. Various materials and fastenings may be used. Other car body shapes may find particular application in various instances. Similarly, the supporting structure may take other forms providing vertical support for the ends of the car and longitudinal force in line with the couplers.

What is claimed is:

1. A railroad car having an elongated cylindrical car body formed of thin cylindrical longitudinal walls and closed at the ends by respective end walls, a coupler at each end of said car body for coupling the car to other cars, a truck at each end of said car body, and a supporting structure pivotally mounted on each of said trucks for supporting said car body on the respective truck for transport on rails, each of said supporting structures comprising structural members connecting a respective one of said couplers to the ends of said cylindrical walls at locations substantially balanced vertically and horizontally from the line between the couplers for transmitting forces substantially horizontally from the coupler to the car body, said locations being balanced in the sense that force applied longitudinally at said coupler produces a relatively small net torque on the car body, and bolster means connected to said structural members, extending upward from the respective truck, and connected to the distal end of a respective one of said end walls above said locations for transmitting forces substantially vertically to said end wall at its distal end to support said car body vertically from said respective truck substantially exclusively at the extreme end of the car body while applying relatively small forces longitudinally to the car body, said car body being substantially self-supporting between said supporting structures and transmitting substantially all horizontal forces transmitted between said couplers.

2. A railroad car according to claim 1 wherein said structural members include a stub center still pivotally mounted on the respective truck and extending longitudinally of said car in line with and connected to the respective coupler, and an upper cross beam and a lower cross beam fixedly connected to said center sill respectively above and below the centerline of the coupler and connected at their ends to the ends of said longitudinal walls, and wherein said bolster means includes a strut fixedly connected to said center sill and extending substantially vertically upward from near the pivotal axis of the truck to the distal end of the respective one of the end walls.

3. A railroad car according to claim 1 wherein said longitudinal walls are reinforced by longitudinal members forming a part of said car body and extending between said structural members on opposite ends of said car and supported in fixed spaced relation to said longitudinal walls, said longitudinal members with the portions of said longitudinal walls from which they are supported forming beam columns for transmitting forces longitudinally between respective supporting structures and for supporting said car body against bending under vertical loads.

4. A railroad car according to claim 3 wherein said car body includes stabilizing members affixed circumferentially to the upper part of said longitudinal walls for stabilizing said car body against buckling under beam loading.

5. A railroad car according to claim 1 wherein said end walls are substantially conical and truncated and connected at their truncated ends to respective bolster means.

6. A railroad car according to claim 5 in the form of a hopper car wherein transverse bulkheads extend across the car body to divide it into hopper sections, and slope sheets extend across the lower part of the car body in each section at an angle of about 50° to the horizontal, the lower part of said longitudinal walls lying at an angle of about 50° to the horizontal, and the conical end walls extending from the lowest part of said longitudinal walls at an angle of about 50° to the horizontal.

7. A railroad car according to claim 5 wherein said car body further includes reinforcing members extending along said end walls substantially straight from respective support means to locations thereabove on the respective ends of said longitudinal walls for reinforcing said end walls against buckling under beam loading.

8. A railroad car according to claim 1 wherein said longitudinal and end walls of said car body comprising continuously wound filaments in a resin matrix, the filaments lying in said longitudinal walls at an angle of less than 30° to the longitudinal direction and extending in said end walls to the connection of the end walls to said bolster means.

9. A railroad car according to claim 8 wherein said filaments are concentrated in said end walls at the connection to said bolster means.

10. A railroad car having an elongated cylindrical car body formed of thin cylindrical longitudinal walls and closed at each end by a respective truncated substantially conical end wall, a coupler at each end of said car body for coupling the car to other cars, a truck at each end of said car body, and a supporting structure pivotally mounted on each of said trucks for supporting said car body on the respective truck for transport on rails, said longitudinal and end walls of said car body comprising continuously wound filaments in a resin matrix, the filaments lying in said longitudinal walls at an angle of less than 30° to the longitudinal direction and extending in said end walls to the region of their truncation.

11. A railroad car according to claim 10 wherein said end walls are connected at their truncated ends to respective ones of said supporting structures.

12. A railroad car according to claim 11 wherein said car body further includes reinforcing members extending along said end walls substantially straight from respective truncated ends to locations thereabove on the respective ends of said longitudinal walls for reinforcing said end walls against buckling under beam loading.

13. A railroad car according to claim 10 wherein said longitudinal walls are reinforced by longitudinal members forming a part of said car body and extending between said supporting structures on opposite ends of said car and supported in a fixed spaced relation to said longitudinal walls, said longitudinal members with the portion of said longitudinal walls from which they are supported forming beam columns for transmitting forces longitudinally between respective supporting structures and for supporting said car body against bending under vertical loads.

14. A railroad car according to claim 13 wherein said longitudinal members are formed of woven filaments in a resin matrix and are spaced from said longitudinal walls by a lightweight core structure.

15. A railroad car according to claim 13 wherein transverse members extend across said car body between said beam columns to support said beam columns transversely between their ends and thereby reduce the unsupported lengths of said beam columns to increase their buckling strength.

16. A railroad car according to claim 15 wherein said longitudinal members are formed of woven filaments in a resin matrix and are spaced from said longitudinal walls by a lightweight core structure, and said transverse members each comprises two sheets of filaments in a resin matrix, said sheets being spaced by a lightweight core structure secured between them.

17. A railroad car according to claim 16 in the form of a hopper car wherein said transverse members are bulkheads and slope sheets, said bulkheads dividing said car body into hopper sections, and said slope sheets forming ends of the lower portions of said hopper sections to facilitate unloading.

18. A railroad car according to claim 17 wherein said slope sheets, the lower portions of said longitudinal walls, and the end walls extending from the lowest part of said longitudinal walls lie at an angle of about 50° to the horizontal.

19. A railroad car according to claim 13 wherein said car body includes stabilizing members affixed circumferentially to the upper part of said longitudinal walls for stabilizing said car body against buckling under beam loading.

20. A railroad car according to claim 10 wherein said angle is substantially about 20°.